Sept. 29, 1953

H. CUVILLIEZ 2,654,030

TELEVISION ANTENNA SYSTEM

Filed Oct. 10, 1950

INVENTOR.

Henri Cuvilliez

Patented Sept. 29, 1953

2,654,030

UNITED STATES PATENT OFFICE 2,654,030

TELEVISION ANTENNA SYSTEM

Henri Cuvilliez, New York, N. Y.

Application October 10, 1950, Serial No. 189,346

2 Claims. (Cl. 250—33)

This invention relates generally to the field of radio communication and more particularly to an improved television antenna system.

As is well known in the present state of the television art, by virtue of the high frequency of the composite television signal which is radiated, optical effects are encountered. This gives rise to poor conditions of reception resulting frequently in pictures of poor quality, sound of poor quality, inconstant operation, and other improper visual or audible effects.

It is therefore among the objects of the present invention to provide a television antenna system in which the foregoing disadvantageous reception conditions are eliminated or substantially improved.

It is known to utilize television antenna systems in which a small element is used for higher frequencies and a larger element is used for the lower frequencies, but it has been found that such systems are inadequate to cope with adverse locations where excessive interference, ghosts, and the changing weather conditions between the signal source and the point of reception are encountered.

It is therefore another object herein to provide a television antenna system in which the most satisfactory signal of a given frequency or wave length may be obtained by a selection of radio frequency energy from either a high frequency antenna, or a low frequency antenna. The present television antenna system also extends means whereby the radio frequency energy induced in the small and large antennas may be combined in direct or inverse polarity or may be attenuated.

In certain locations as for example apartment houses, military installations, television stores or service centers, it is desirable to simultaneously operate a plurality of independent television receivers without deleterious interaction. While it has been proposed to amplify the signal and to distribute the same by various means, the present television antenna system enables the operation of a plurality of television sets from a single television antenna installation utilizing only a single high frequency antenna element and a single low frequency antenna element.

Another object of the present invention lies in the provision of structure including a television receiver in which the antenna elements may be electrically separated from the receiver, combined independently with the receiver, combined with each other and with the receiver, or combined with the ground and the receiver.

Another object herein lies in the provision of structure of the class described wherein ground signals may be sent to the receiver independently or in combination with signals picked up by the antenna elements in a plurality of combinations.

A still further object of the present invention lies in the provision of an antenna system which presents highly effective utility where the signal strength at the point of reception is poor, regardless of whether this is caused by distance, disadvantageous terrain, or adverse weather conditions.

The present system has an object to improve over-all television reception and to avoid the necessity for the use of additional electronic amplifying steps commonly referred to as boosters.

A feature of the invention lies in the fact that by the use of the present structure, when the signal becomes too strong so as to give improper picture or sound results, the input to the television set may be effectively reduced to produce a good result in both picture and sound.

These objects and other incidental ends and advantages will be more fully apparent during the progress of the following disclosure, and be pointed out in the appended claims.

In the drawings, to which reference will be made in this specification, similar reference characters have been employed to designate corresponding parts throughout the several views.

Figures 1, 2:
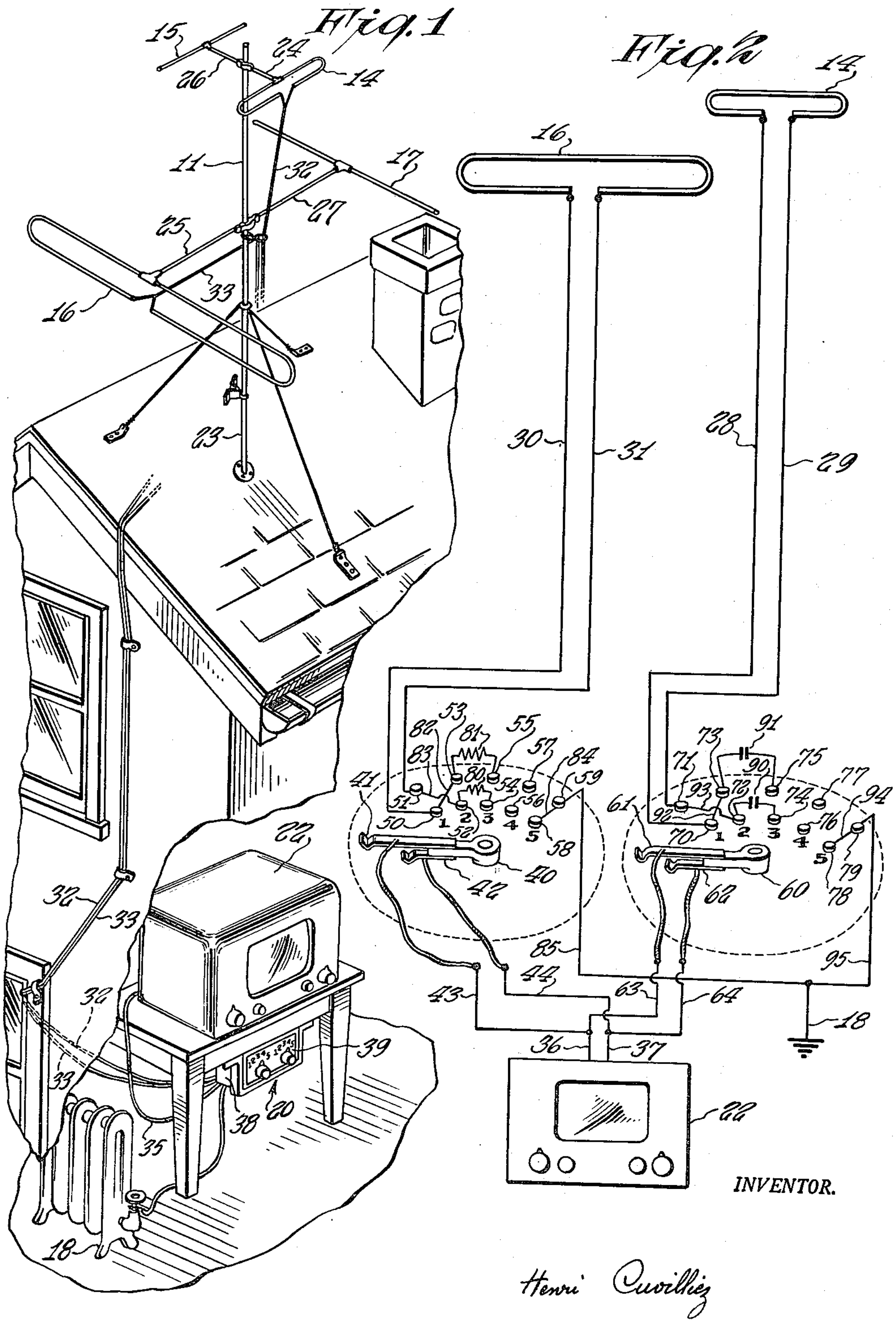
Figure 1 is a view in perspective of an embodiment of the invention.
Figure 2 is a schematic view.

In accordance with the invention, a television antenna system may include a television antenna 11 including a high frequency antenna element 14, a low frequency antenna element 16, a ground element 18 and means 20 for selectively connecting the antenna elements 14 and 16 and the ground element 18 to a television receiver 22.

The antenna element 14 may be of any suitable type for picking up high frequency electromagnetic radiation of the character used in television transmission and may include a reflector 15. The antenna element 16 may be of any suitable type for picking up high frequency magnetic radiation of the character used in television transmission and may include a reflector 17. The elements 14 and 16 may be suitably supported upon an upright 23 by the supports 24 and 25 and the reflectors 15 and 17 may be likewise carried in proper position by the supports 26 and 27.

Extending from the high frequency antenna element 14 are first and second lead-ins 28 and 29 and extending from the low frequency antenna element 12 are third and fourth lead-ins 30 and 31. The lead-ins 28—31 may travel to the means 20 in any suitable manner as for example as spaced and parallel conductors or as parts of coaxial cables, said cables being indicated by reference characters 32 and 33.

The television receiver 22 may be of any suitable type including an input 35 which may have fifth and sixth lead-ins 36, 37.

The means for selectively connecting the antenna elements and the ground element to the receiver may be disposed within a cabinet 38 having a panel 39 and includes a plurality of double pole multi-throw switches generally indicated by reference characters 40 and 60. The switches 40 and 60 include arms 41 and 42, and 61 and 62 respectively. The arms in each switch are electrically insulated from each other and it is preferable that there exist between the arms in each switch a minimum of interelectrode capacity. The specific switch construction shown in Figure 2 will be understood as being principally by way of illustration and any switch construction having the desired radio frequency operating characteristics, arms, and requisite contacts may be used.

The arms 41 and 42 are connected to the lead-ins 36 and 37 respectively by the conductors 43 and 44.

As shown in Figure 2 the lead-in 30 is connected to the switch contact 50 while the lead-in 31 is connected to the switch contact 51. These contacts are located in the first position marked "1" of the switch 40 and form the first pair of contacts. The second pair of contacts 52 and 53 disposed in the second position of switch 40 are connected in inverse polarity to the contacts 50 and 51 by the conductors 82 and 83. The third pair of switch contacts 54 and 55 of the switch 40 which may be referred to as the low frequency switch, are connected to the juxtaposed second pair of switch contacts through resistors 80 and 81. Disposed to the right, as viewed in Figure 2, are the switch contacts 56 and 57 which are the fourth pair in the fourth position of the low frequency switch, and said contacts 56 and 57 are electrically isolated from all other components.

Contacts 58 and 59 are the fifth pair in the fifth position and are joined by a conductor 84. The contacts 58 and 59 are connected to the ground 18 by a conductor 85.

The lead-in 28 is connected to the switch contact 70 while the lead-in 29 is connected to the switch contact 71. These contacts are located in the first position marked "1" of the switch 60 and form the first pair of contacts for said switch. As in the case of switch 40 several positions of the switch 60 are marked "1" to "5," inclusive. The second pair of contacts 72 and 73 disposed in the second position of the switch 60 are connected in inverse polarity to the contacts 70 and 71 by the conductors 92 and 93. The third pair of switch contacts 74 and 75 of the switch 60 which may be referred to as the high frequency switch are connected to the juxtaposed second pair of switch contacts through capacitors 90 and 91. Disposed to the right as viewed in Figure 2 are the switch contacts 76 and 77 which are the fourth pair in the fourth position of the high frequency switch and said contacts 76 and 77 are electrically isolated from all other components.

Contacts 78 and 79 are the fifth pair in the fifth position and are joined by a conductor 95. The contacts 78 and 79 are connected to the ground 18 by a conductor 95. Switch arms 61 and 62 are connected to the lead-ins 36 and 37 respectively by the conductors 63 and 64.

*Operation*

By the use of the plurality of antenna elements in combination with means for selectively connecting the same to a television receiver, a large number of combinations of signal input may be fed to the receiver 22. The present system is highly useful in connection with television reception because few locations are free from disadvantageous conditions of geography and terrain and even where there is a clear and unobstructed path for signals between the television transmitting antenna and the receiving antennas, weather conditions, and signal reflections present problems.

I have found that by the system here disclosed, the operator may make a selection at any given time of the signals available at a given frequency so that superior picture and sound results are obtained from the receiver. This selection not only includes the signals which are independently picked up by the individual antennas but also through the ground and various combinations thereof.

Thus with the high frequency switch 60 in the fourth position on contacts 76 and 77, said switch, open circuited and by the rotation of the switch 40 the signals picked up by the low frequency antenna element 16 may be fed through the switch contacts 50 and 51, or reversed in polarity at the second position of said switch. In the third position the signals are attenuated and the disadvantageous effects of too great a signal input are overcome. Movement of switch 40 to the fourth position provides pickup by the lead-ins 43 and 44 and 36 and 37 and in locations where the television signal is strong such position is operative. At the same time of course there is pickup in the lead-ins 63 and 64. In position five of the low frequency switch 40 signals transmitted to the receiving location through the ground are fed to the receiving set 22.

When the low frequency switch 40 is in the fourth position direct input from the high frequency antenna 14 is obtained with the switch 60 in its first position. Inverse polarity is provided by the second position of said switch 60. Capacitatively coupled attenuation is obtained in the third position of switch 60. Position four provides the third pickup previously described, while position five picks up the ground signals.

I have found that depending upon the reception conditions, high quality picture and sound reception is obtained when signals taken from the antenna elements 14 and 16 are fed simultaneously to the receiver 22 and under certain conditions said reception is obtained when the antenna inputs are bypassed to ground through the switches 40 and 60. While I have shown a particular type of antenna installation having some well known forms of antennas, it will be understood that these are by way of example only and other antenna shapes and sizes may be used. It will also be understood that various forms of transmission lines may be used to conduct the signals picked up by the antenna elements to the means 20.

While at the present time the television bands permit the use of two antennas to cover the channels from one to thirteen, where the receiver 22 is adapted to handle other bands, additional antenna elements may be used in conjunction with additional switches corresponding to the switches 40 and 60, the arms of which are connected in parallel as are the grounded portions thereof. Thus in accordance with the present system four or more different antenna elements may be used in combination with four or more switches in the means 20.

Under certain conditions of operation, it is advantageous to have the antenna elements of multiple types as for example stacked arrays which have particular effectiveness for certain frequencies or which have directional effects.

Another advantage of the present system resides in the fact that where there is a means 20 provided for each receiver, a plurality of receivers may take energy from single antenna elements having given wave bands. This results in the elimination of special amplifiers and transmission line rigs where a number of sets with the same antenna setup, as for example in apartment houses or stores where sets are demonstrated.

In accordance with accepted installation and operational practice, it is desirable that the antenna impedance be substantially less than receiver input impedance. With respect to the value of the resistors 80 and 81 this may be varied depending upon the intensity of the signal in the antenna. I have found that the value of substantially 2.2 megohms for each of these resistors is satisfactory to accommodate the system to urban and suburban conditions. The capacitors 90 and 91 are preferably small and I have found a value of substantially .00005 microfarad to be useful within the same geographic range as in the resistors 80 and 81.

By the manipulation of the means for selectively connecting the antenna elements and the ground element to the receiver, improved reception both as to picture and sound is obtained and as presently understood it is believed that the present system affords means for varying the effective impedance of the antenna and lead-ins with respect to the receiver and for favorably altering the standing wave transmission characteristics of the lead-ins.

I wish it to be understood that I do not desire to be limited to the exact details shown and described in this specification, for obvious modifications will occur to a person skilled in the art to which the present invention pertains.

I claim:

1. A system for the transmission of radio frequency energy comprising: a device for utilizing said energy; an antenna including first and second antenna elements; first and second attenuation means; a ground element; and means to selectively connect said antenna element and the ground element to said device in a plurality of circuit arrangements including a first connection in which the first antenna element is connected to the device in a first polarity; a second connection in which the first antenna element is connected to the device in inverse polarity with respect to said first polarity; a third connection in which the first attenuation means is disposed in circuit between the first antenna element and said device; a fourth connection in which the first antenna element is disconnected from said device; a fifth connection in which the second antenna element is connected to the device in a certain polarity; a sixth connection in which the second antenna element is connected to said device in a reverse polarity with respect to said certain polarity; a seventh connection in which the second attenuation means is disposed in circuit between the second antenna element and said device; an eighth connection in which the second antenna element is disconnected from said device; a ninth connection in which said device is connected to said ground element; and means for simultaneously forming any of said first five mentioned connections with any one of said last mentioned four connections with said device.

2. A system for the transmission of radio frequency energy comprising: a device for utilizing said energy; an antenna including first and second antenna elements; first and second attenuation means; a ground element; and means to selectively connect said antenna element and the ground element to said device in a plurality of circuit arrangements including a first connection in which the first antenna element is connected to the device in a first polarity; a second connection in which the first antenna element is connected to the device in inverse polarity with respect to said first polarity; a third connection in which the first attenuation means is disposed in circuit between the first antenna element and said device; a fourth connection in which the first antenna element is disconnected from said device; a fifth connection in which the second antenna element is connected to the device in a certain polarity; a sixth connection in which the second antenna element is connected to said device in a reverse polarity with respect to said certain polarity; a seventh connection in which the second attenuation means is disposed in a circuit between the second antenna element and said device; an eighth connection in which the second antenna element is disconnected from said device; a ninth connection in which said device is connected to said ground element; and means for simultaneously forming any of said first five mentioned connections with any one of said last mentioned four connections with said device, said means including a pair of multiple switches.

HENRI CUVILLIEZ.

References Cited in the file of this patent

UNITED STATES PATENTS

| Number | Name | Date |
|---|---|---|
| 1,424,365 | Loftin et al. | Aug. 1, 1922 |
| 2,187,015 | Cork et al. | Jan. 16, 1940 |

OTHER REFERENCES

Tele-Tech, July 1949, page 27.

Publication: "Your Best Move," by Oak Ridge Antennas, page 2, 239 East 127th St., New York, N. Y.